G. W. CUNNINGHAM.
Plow.
No. 30,125.
Patented Sept. 25, 1860.
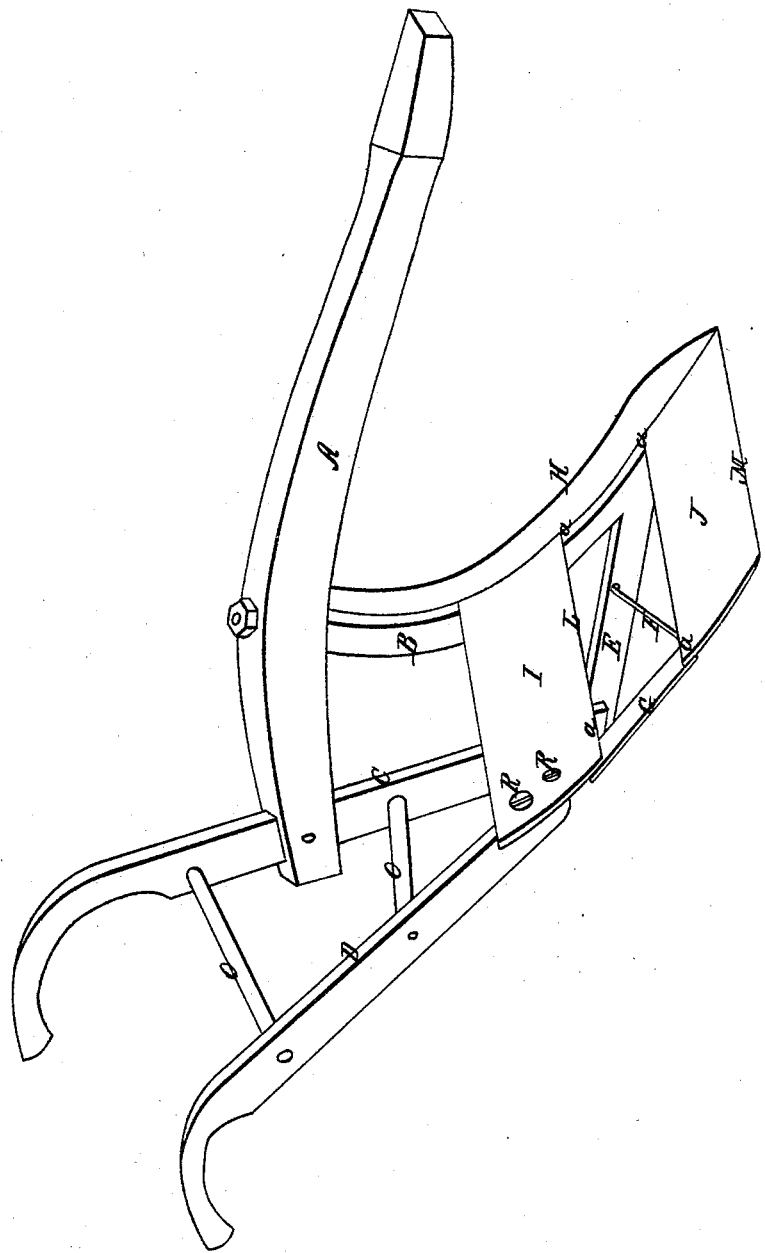

UNITED STATES PATENT OFFICE.

G. W. CUNNINGHAM, OF PARIS, MISSOURI.

IMPROVEMENT IN PLOWS.

Specification forming part of Letters Patent No. 30,125, dated September 25, 1860.

*To all whom it may concern:*

Be it known that I, G. W. CUNNINGHAM, of Paris, in the county of Monroe and State of Missouri, have invented a new and useful Improvement in Plows; and I hereby declare the following to be a clear, full, and exact description thereof, reference being had to the accompanying drawings, making part of this specification, in which—

The drawings represent a perspective view of the plow.

Similar letters of reference indicate corresponding parts in each of the several figures.

The mold-board I G J of my plow, extending laterally from the standard B, is open at *a a a*, and the horizontal edges L and M are made sharp. The standard B is provided with a colter-edge from the point up to the plow-beam A, to which the standard is secured in the usual manner. The landside-handle C is attached to the rear end of the plow-beam, and to the rear end of the landside E, the latter extending from the point of the standard back.

The furrow-side handle D is fastened to the outer end of the upper part of the mold-board, as seen at R R. The two handles D C are also connected by lateral base-rods O O.

By extending the hole *a a a a* not quite out in the direction of the furrow side the portion G of the mold-board serves as a continuation of the furrow-side handle D, and thus a very firm and rigid support is furnished to said handle.

The colter H and the lower mold-board, H M, serve to cut the slice from the soil. The slice, as it moves up the curved surface of the part J of the mold-board, meets the upper mold-board edge L, which serves to cut the slice so that part of the slice drops through hole *a a a a* onto the ground, while the rest of the slices pass up the surface of the curved part I of the mold-board, and drop finally over the upper edge of said part I of the mold-board.

By the combination of the three edges H M L the soil is very effectually cut up, as above described, and the plow will well answer for various purposes of plowing.

What I claim as my improvement, and desire to secure by Letters Patent, is—

The arrangement, in a plow, of a mold-board, I G J, open at *a a a a*, colter H, sharp edges M L, furrow side E, handles D C, and beam A, as and for the purposes herein described.

G. W. CUNNINGHAM.

Witnesses:
 J. H. CAMPBELL,
 THOS. LEACK.